Feb. 13, 1968     W. KOEPPE     3,368,674
APPARATUS FOR TESTING CIGARETTES AND THE LIKE
Filed Oct. 4, 1965     2 Sheets-Sheet 1
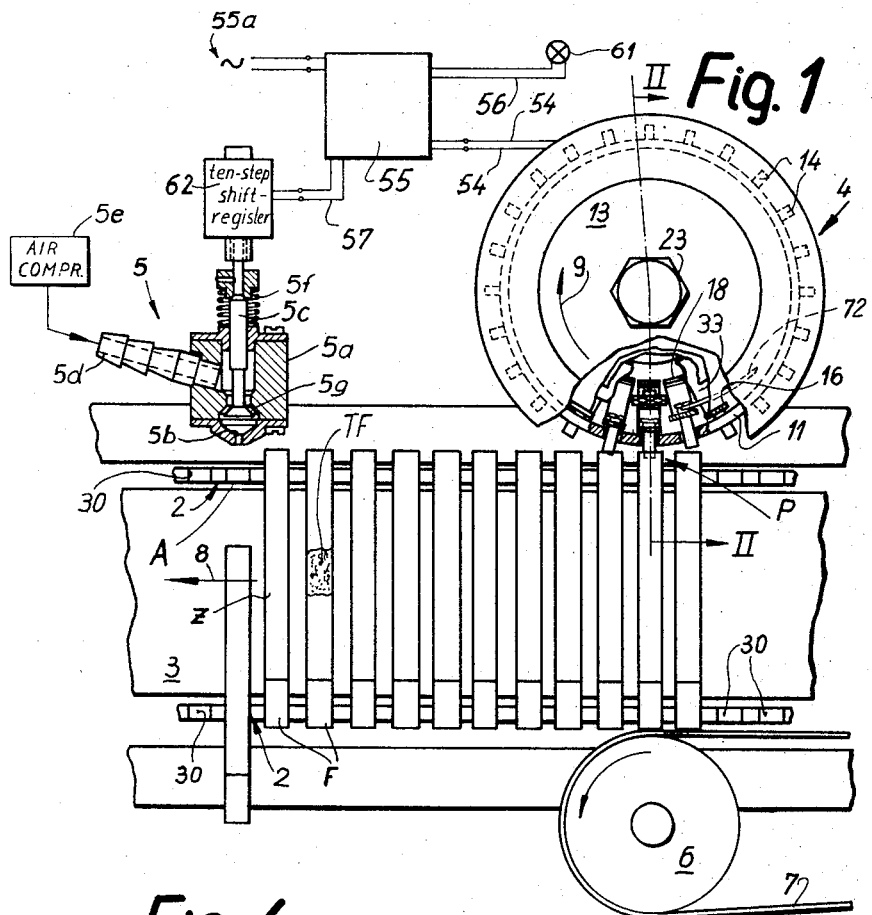
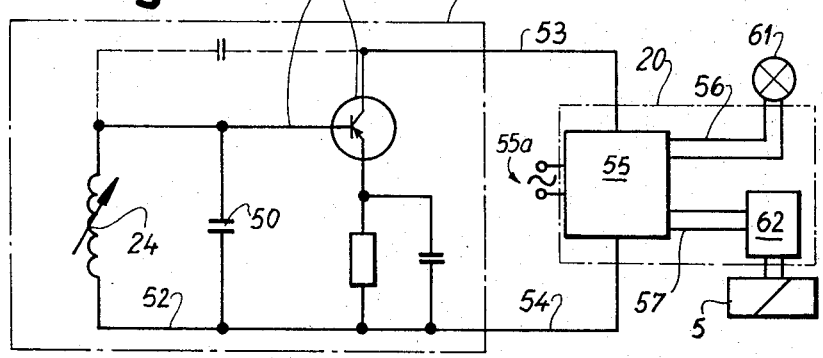
Inventor:
Walter Koeppe
by Michael J. Striker

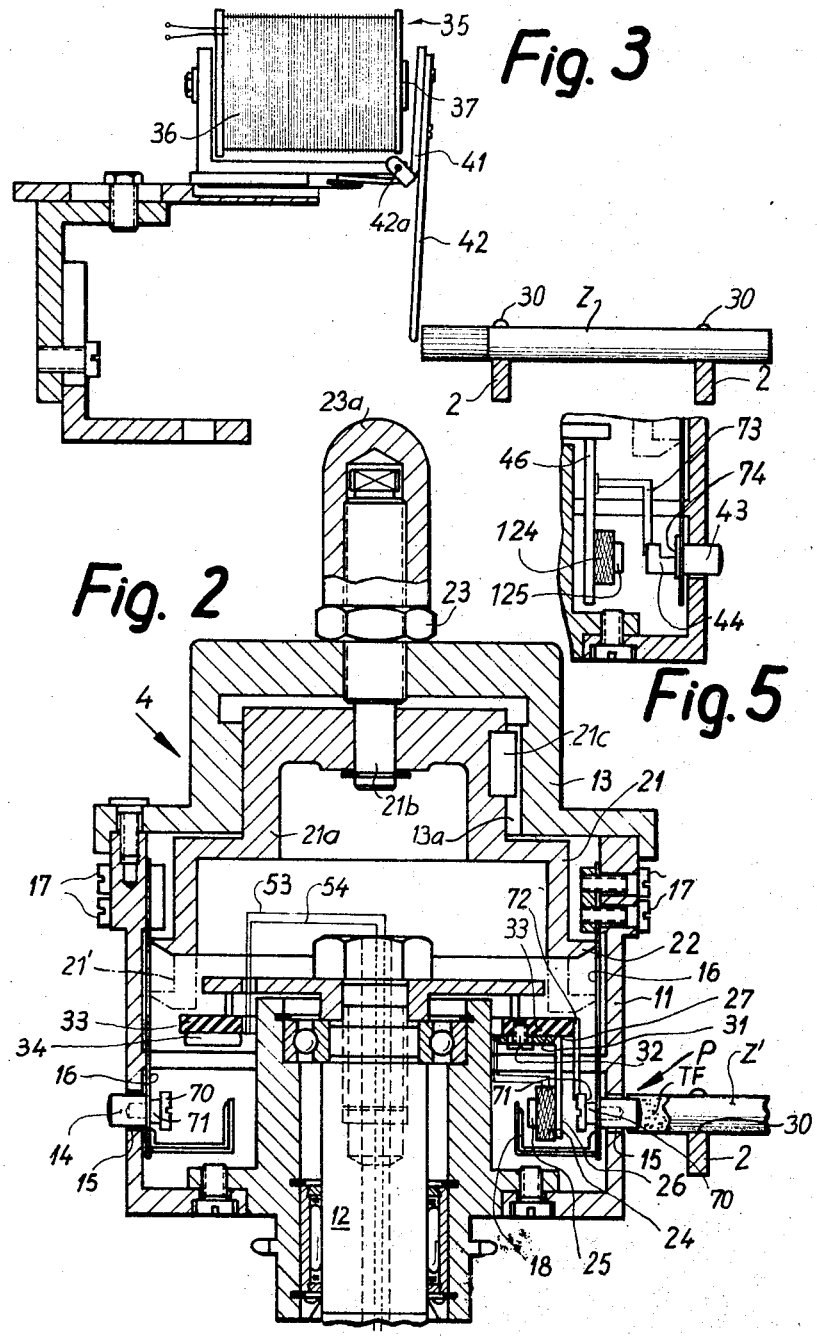

United States Patent Office 3,368,674
Patented Feb. 13, 1968

3,368,674
APPARATUS FOR TESTING CIGARETTES
AND THE LIKE
Walter Koeppe, Hamburg-Bergedorf, Germany, assignor to Hauni-Werke Koerber & Co. K.G., Hamburg-Bergedorf, Germany
Filed Oct. 4, 1965, Ser. No. 492,435
Claims priority, application Germany, Oct. 3, 1964, H 53,928
17 Claims. (Cl. 209—79)

ABSTRACT OF THE DISCLOSURE

The integrity of fillers in cigarettes or like rod-shaped articles is tested while the cigarettes travel sideways past a testing station wherein the pin of a detector is biased against one end of the filler to determine its density. If the filler end is too soft, the displacement of the pin is excessive whereby an extension of the pin changes the inductance of a coil in an oscillator circuit. Such change in inductance produces a signal which is used to segregate the article with defective filler from satisfactory articles.

The present invention relates to an apparatus for testing cigarettes, cigars, cigarillos, cheroots, filter rods, filter mouthpieces and similar rod-shaped articles. More particularly, the invention relates to improvements in an apparatus which is especially suited for determining the density of tobacco fillers at the longitudinal ends of tobacco-containing rod-shaped articles or the density of fillers in filter rods. Still more particularly, the invention relates to an apparatus which, in addition to detecting defective rod-shaped articles, also serves to automatically eject such defective articles to thus prevent their admission to a packing, storing, wrapping or other processing station.

It is an important object of the present invention to provide a testing apparatus wherein the articles are tested mechanically and wherein the detection of defective articles results in automatic ejection of such articles regardless of the speed at which the articles advance between the testing and ejecting stations.

Another object of the invention is to provide a testing apparatus which can test each of a series of rapidly advancing articles and which can actuate the ejecting mechanism in such a way that only a defective article is removed from the path of articles but the satisfactory articles invariably remain unaffected despite the fact that the articles can move at a high rate of speed and that individual defective articles may alternate with individual satisfactory articles.

A further object of the invention is to provide a novel electric circuit which can initiate automatic ejection of defective articles in response to detection of such articles at the testing station.

An additional object of the invention is to provide a testing apparatus of the above outlined characteristics wherein the testing operation may be adjusted with utmost accuracy and in such a way that it is up to the operator to determine that extent of defectiveness of the filler in a cigarette or the like which warrants ejection or removal of the respective cigarette from its path.

Still another object of the invention is to provide a testing apparatus wherein, if desired, both longitudinal ends of each of a series of consecutive fillers may be tested in a simultaneous operation or wherein only one longitudinal end of each filler is subjected to a density test.

A further object of the invention is to provide a combined testing and ejecting apparatus wherein the distance between the testing and ejecting stations may be selected at will without in any way affecting the accuracy of the testing and/or ejecting operation.

An additional object of the invention is to provide an apparatus of the just outlined characteristics wherein only the detection of defective articles (i.e., the actual testing operation) is effected by mechanical means but wherein the transmission of impulses to operate the ejecting device is effected without resorting to linkages, gear trains and similar conventional mechanical motion transmitting devices which are subjected to wear, which can be affected by the presence of foreign matter, and whose inertia prevents them from operating at a high frequency such as is required in testing of rod-shaped articles which issue from a modern mass-producing machine.

Another object of the invention is to provide an apparatus for subjecting the longitudinal ends of fillers in cigarettes and similar deformable rod-shaped articles to a density test wherein the testing operation is carried out without resorting to compressed air so that the testing device of the apparatus can operate without seals which are necessary in many heretofore proposed testing devices.

An additional object of the invention is to provide a testing apparatus which may comprise a single detector or a plurality of detectors, wherein such detector or detectors are configurated in such a way that they are ideally suited for testing of fillers in cigarettes, cigars, filters or similar deformable rod-shaped bodies, and wherein the actual testing device may be rapidly and conveniently converted for testing of different types of rod-shaped articles or for testing the same type of articles with a desired degree of accuracy.

Briefly stated, one feature of my invention resides in the provision of an apparatus for testing the integrity of fillers in cigarettes and similar deformable rod-shaped articles. The testing apparatus comprises conveyor means for advancing the articles, preferably sideways, past a testing station, and testing means provided at the testing station for subjecting one longitudinal end of a filler at such station to a density test. The testing means comprises detector means movable toward the ends of fillers at the testing station, displacing means for biasing the detector means into the fillers whereby, in yielding to such bias, a defective filler permits excessive displacement of the detector means, and an oscillator circuit including an induction coil positioned to have its inductance changed in direct response to displacement of the detector means so that the changes in inductance reflect the condition of the tested filler.

The testing means may comprise a single induction coil and a single detector or an entire annulus of pin-shaped or otherwise configurated detectors which orbit in a zone adjacent to the path of the articles and are caused to move seriatim into registry with the longitudinal ends of consecutive fillers. The displacing means may comprise leaf springs or similar resilient elements whose bias is adjustable to thereby select such minimum displacement of detectors which is to be indicative of a defective filler.

The changes in inductance of the coil may be used to operate a pneumatic, mechanical, electromagnetic or otherwise constructed ejecting device which removes defective articles from the conveyor means in automatic response to signals produced by the oscillator circuit or in response to the absence of signals, depending on the type of oscillator circuit. Thus, the circuit may produce an impulse in response to detection of a satisfactory article but such impulse will not trigger the ejecting device. Alternatively, the oscillator circuit may produce impulses in response to detection of defective articles, and such impulses are then used to actuate or operate the ejecting device. In other words, the operation of the ejecting device may be initiated in response to the generation or in response to the absence of signals.

The operative connection between the ejecting device and the testing means preferably comprises a suitable delay unit, such as an electric signal storing assembly, which insures that the ejecting device is operated with a certain delay following the detection of an unsatisfactory filler. This is normally necessary because the ejecting device is preferably located downstream of (i.e., past) the testing station and might not be immediately adjacent thereto.

The novel features which are considered as characteristic of the invention are set forth in particular in the appended claims. The improved testing apparatus itself, however, both as to its construction and its mode of operation together with additional features and advantages thereof, will be best understood upon perusal of the following detailed description of certain specific embodiments with reference to the accompanying drawings, in which:

FIG. 1 is a partly diagrammatic top plan view of a testing apparatus which embodies one form of my invention with portions of the testing and ejecting devices shown in section or broken away;

FIG. 2 is an enlarged vertical section through the testing device, substantially as seen in the direction of arrows from the line II—II of FIG. 1;

FIG. 3 is a side elevational view of a modified ejecting device;

FIG. 4 illustrates the electric circuitry of the testing apparatus shown in FIGS. 1 and 2; and FIG. 5 is a fragmentary vertical section through a modified testing device.

Referring first to FIG. 1, there is shown a testing apparatus for filter cigarettes Z. The cigarettes are advanced seriatim and sideways by means of a conveyor including two endless belts or chains 2 having transversely aligned pockets or holders 30 which maintain the cigarettes at a uniform distance from each other. The median portions of the cigarettes Z rest on the upper stringer of a centrally located conveyor belt 3 which travels at the speed of the belts 2 and in the same direction. The testing station P is adjacent to one side of the path in which the cigarettes Z are advanced in the direction indicated by an arrow 8. The testing station P accommodates a testing device 4 which is located opposite a driven roller 6 serving to advance an endless backup belt 7, this belt being used to hold satisfactory cigarettes against axial displacement in the course of the actual testing operation. The belt 7 and the roller 6 may be replaced by a second testing device 4 so that the apparatus then tests both longitudinal ends of each consecutive cigarette in a simultaneous operation. The second testing device tests the fillers of filter mouthpieces F.

An ejecting device 5 is provided at an ejecting station A which is adjacent to the path of the cigarette Z and is located downstream of the testing device 4. In the illustrated embodiment, the ejecting device 5 is operated by compressed air and is arranged to direct a blast or jet of compressed air against the adjacent end face of that cigarette which has been found to be defective during travel past the testing station P. As shown in FIG. 1, the ejecting device 5 comprises a nozzle 5a having an orifice 5b, and a solenoid valve including a valve member 5c which normally seals the orifice 5b from a supply conduit 5d. The latter is connected with a suitable source 5e of compressed gas (e.g., an air compressor), and the valve member 5c is biased by a helical spring 5f which normally maintains it in sealing engagement with an annular seat 5g.

An electromagnetic actuating device 62 serves to move the valve member 5c against the bias of the spring 5f and is controlled by the testing device 4 in a manner to be more fully described in connection with FIG. 4. If desired, the ejecting device 5 may be located at the opposite side of the path defined by the conveyor belts 2 and 3.

The testing device 4 comprises a rotor 11 which is rotatable about the axis of a vertical shaft 12, see FIG. 2. The rotor 11 resembles a hollow cylinder and carries a cover or lid 13.

The belts 2 and 3 travel continuously, and the rotor 11 is driven in synchronism with these belts so that it rotates in a clockwise direction as indicated by the arrow 9 shown in FIG. 1. The interior of the rotor 11 accommodates an annulus of equidistant detectors 14 each of which may extend outwardly through a radial aperture 15 of the rotor. The detectors 14 are secured to the lower ends of vertically extending elastic displacing members in the form of leaf springs 16, the upper end portions of these leaf springs being screwed or riveted to the rotor 11, as at 17.

The inner end portion of each detector 14 is formed with an axially extending tapped bore which receives the stem of a screw 70. The heads of the screws 70 constitute cam followers and serve to track a fixed propelling cam 72. The lower end portion of the propelling cam 72 can extend into annular recesses 71 between the heads of the follower screws 70 and the inner end portions of the respective detectors 14.

The testing device 4 further comprises adjusting means for regulating the bias of the leaf springs 16. The springs 16 tend to move the respective detectors 14 radially outwardly and the adjusting means comprises an axially movable ring 21 having an outwardly extending annular flange 22 which engages the leaf springs 16 between the detectors 14 and the screws 17. The ring 21 also comprises a hub 21a which extends into the cover 13 and carries a centrally located rotary spindle 21b whose threads mesh with internal threads of the cover. A lock nut 23 is provided to fix the ring 21 in selected axial position. The lock nut 23 is mounted between the top wall of the cover 13 and a knob 23a which is non-rotatably fixed to the spindle 21b. A key 21c is guided in vertical ways 13a of the cover 13 to prevent rotation of the ring 21 in response to rotation of the spindle 21b.

The spindle 21b may move the ring 21 to and beyond the phantom-line position 21' shown in FIG. 2. It will be seen that the leaf springs 16 resemble one-armed levers and that the flange 22 of the ring 21 constitutes a movable fulcrum for such levers and can change the effective length (and hence the bias) of the springs 16.

The testing device 4 also comprises a single induction coil 24 which is indirectly supported by the fixed shaft 12 and includes a core 25. The coil 24 is mounted on a holder or arm 26 whose upper end is articulately affixed at 27 to or forms part of a plate-like carrier 31. This carrier is formed with an elongated slot for a threaded fastener 32 which is affixed to the underside of a stationary plate-like support 33 consisting of insulating material. By loosening the fastener 32, the operator can select the distance between the coil 24 and the path of the filter cigarettes Z to thereby determine the nature of defects which should produce a signal serving to actuate the ejecting device 5.

The support 33 carries at its underside the printed portion of an oscillator circuit 10 which is shown in FIG. 4. The underside of the support 33 further supports a transistor 34 which forms part of the circuit 10. The coil 24 also forms part of this circuit.

The curvature of the aforementioned arcuate propelling cam 72 is different from the curvature of the rotor 11 so that on engagement with a follower screw 70, the propelling cam 72 will cause the corresponding detector 14 to move radially inwardly and to flex the respective leaf spring 16 about the flange 22 of the ring 21. The propelling cam 72 is fixedly mounted in a zone just ahead of the point where the detectors 14 meet the adjoining ends of the cigarettes Z, and this cam releases the detectors 14 in time to allow for radially outward movement so that the detectors are propelled by the leaf springs 16 and tend to penetrate into the adjoining ends of the tobacco fillers TF. In other words, the cam 72 causes the leaf springs 16 to store energy and to release such energy at the time when the respective detectors 14 register with tobacco fillers at the testing station P.

The oscillator circuit 10 of FIG. 4 serves to produce signals which will actuate the ejecting device 5 with a certain delay necessary to account for the time required by a defective cigarette to advance from the testing station P to the ejecting station A. The circuit 10 includes the aforementioned coil 24, a capacitor 50 and the transistor 34. The smaller circuit including the coil 24 and capacitor 50 is also called a tank circuit, and its coil 24 is connected with conductors 51, 52 in parallel with the capacitor 50. The inductance of the coil 24, and hence the condition of the circuit 10, will be determined by the position of detectors 14 during engagement with the cigarettes Z.

It will be seen that the connection between the tank circuit including the parts 24, 50 and the transistor 34 is of the so-called overcritical type.

Conductors 53 and 54 connect the circuit 10 with an amplifier 55 which is also connected with a source 55a of electrical energy. The exact construction of the amplifier 55 forms no part of the present invention; it suffices to say that this amplifier comprises a relay (not shown) which controls two parallel circuits 56 and 57. The circuit 56 includes a signal lamp 61 and the circuit 57 includes the aforementioned actuating device 62 for the valve member 5c of the ejecting device 5. The signal lamp 61 lights up whenever the testing device detects a defective cigarette.

The unit 20 including the parts 55, 56, 57, 61 and 62 is located outside of the testing device 4. Therefore, the conductors 53, 54 which connect the circuit 10 with the unit 20 extend through the support 33 and through the bore of the fixed shaft 12, see FIG. 2.

The operation of the testing apparatus shown in FIGS. 1, 2 and 4 is as follows:

The purpose of the testing operation is to determine the density of tobacco in one longitudinal end of each tobacco filler TF. The cigarettes Z are advanced by the belts 2, 3 and rest in the holders 30 so that they are equidistant from each other and move sideways. The rotor 11 of the testing device 4 is driven in a clockwise direction, as viewed in FIG. 1, and advances the detectors 14 at such a speed that each detector tests the adjoining end of a different filler TF and that each cigarette undergoes a density test while passing along the testing station P. The propelling cam 72 causes consecutive leaf springs 16 to store energy and to dissipate such energy at the station P so that the respective detectors 14 are propelled toward the end faces of the aligned tobacco fillers TF.

If a cigarette is satisfactory, i.e., if the result of the test is positive because the tobacco filler TF at the tested end of the cigarette offers a satisfactory resistance to penetration of the corresponding detector 14, such detector cannot move beyond a preselected distance from the coil 24. However, if a detector 14 meets a defective cigarette one end of which contains too little tobacco, the corresponding leaf spring 16 will bring about excessive displacement of the detector 14 which will move radially outwardly and through such a distance that the coil 24 will cause the circuit 10 to produce a signal to light up the lamp 61 and to actuate the ejecting device 5.

In order to distinguish between satisfactory and defective cigarettes, each defective cigarette or each satisfactory cigarette must produce a signal whereas the other cigarette produces no signal at all. In the embodiment of FIGS. 1, 2 and 4, the signals are produced by defective cigarettes, and such signals are used to bring about operation of the ejecting device 5. In other words, the tank circuit 24, 50 of the oscillator circuit 10 is tuned in such a way that its condition remains unchanged whenever a detector 14 tests a satisfactory cigarette Z. FIG. 2 shows that the right-hand detector 14 has detected a defective cigarette Z' because its outer end portion was permitted to penetrate excessively into the tobacco filler TF so that the corresponding follower screw 70 is located beyond a maximum permissible distance from the core 25 of the coil 24. If the test result is positive, the distance between the core 25 and the momentarily aligned detector 14 is less. Each leaf spring 16 resembles a U-shaped body one leg of which carries the corresponding detector 14. The other leg 18 of the leaf spring 16 straddles the coil 24 at the testing station P and moves too close to the core 25 when the corresponding detector 14 penetrates into the tobacco filler TF of a defective cigarette. This brings about a change in the condition of the tank circuit 24, 50 so that the circuit 10 produces a signal. The signal causes the relay of the amplifier 55 to complete the circuits 56 and 57 so that the lamp 61 lights up and that the actuating device 62 causes the device 5 to eject the defective article.

The delay in operation of the ejecting device 5 subsequent to detection of a defective cigarette Z' is constant only if the speed of the belts 2 is constant. Thus, and though the distance between the stations P and A is fixed, the testing apparatus is preferably provided with means for actuating the ejecting device 5 with a delay whose duration is a function of the speed of the belts 2 to make sure that the device 5 will invariably eject only such cigarettes which were found to be defective. The actuating device 62 comprises a flip-flop circuit or an analogous signal storing unit of known design which actuates the device 5 only after the defective cigarette (which has caused the generation of a signal) has been advanced by a requisite distance. In other words, the delay in the actuation of the ejecting device 5 subsequent to detection of a defective cigarette at the station P preferably is not a function of time but rather a function of the distance covered by the defective cigarette in a direction beyond the testing station. One can say that, and since the belts 2 are driven constantly, the delay in the actuation of the device 5 is a function of the distance covered by the belts 2 (or of the rotor 11) subsequent to detection of a defective article. Reference may be had to the copending application Ser. No. 431,355 of Albert Esenwein which is assigned to the same assignee and discloses delay units capable of being used in the present testing apparatus.

In FIG. 1, the distance between the stations A and P equals the distance between ten consecutive cigarettes Z on the belts 2. This means that the actuating device 62 must store a signal for a period of time required to move the belts 2 by a predetermined distance, irrespective of irregularities in the speed at which the belts advance when the conveyor is set in motion.

If a first defective cigarette is immediately followed by a second defective cigarette, the signal storing unit of the actuating device 62 receives two consecutive signals and causes the device 5 to eject the first defective cigarette after the second defective cigarette has been advanced by a distance corresponding to the distance between the stations P and A minus the distance between two adjoining cigarettes. The arrangement may be such that the ejecting device 5 remains operative for a period of time corresponding to the interval required for two consecutive cigarettes to cover a unit distance provided, of course, that the signals stored in the device 62 were received consecutively and were produced by two defective cigarettes which are accommodated in two consecutive (immediately adjacent) pairs of transversely aligned holders 30.

It is evident that the circuit 10 of FIG. 4 may be replaced by a circuit which will produce a signal in response to testing of a satisfactory cigarette and that the actuating device 6 then operates the ejecting device 5 in response to the absence of a signal. This will be described in connection with FIG. 5. The circuit 56 is then completed only when the circuit 10 does not produce a signal between two intermittent movements of the belts 2.

FIG. 3 illustrates a modified ejecting device 35 which comprises an electromagnet having a winding 36 and a fixed core 37. The armature 42 resembles a two-armed lever which is fulcrumed at 42a and is biased to inoperative position by a leaf spring 41. When the actuating device 62 (see FIG. 4) completes the circuit of the winding 36 the core 37 suddenly attracts the upper arm of the lever 42 against the bias of the spring 41 so that the lower arm of the lever automatically ejects a defective cigarette.

Referring finally to FIG. 5, there is shown a modified detector 43 which carries a hook-shaped follower or extension 44 replacing the follower screw 70 of FIG. 2. The core 125 extends toward the follower 44 and the coil 124 causes the oscillator circuit to produce a signal when the distance between the core 125 and the momentarily aligned follower 44 exceeds a predetermined value, i.e., when the outer end portion of the detector 43 penetrates into the tobacco filler TF of a defective cigarette. The coil 124 is mounted on an adjustable carrier 46 corresponding to the carrier 26, 31 shown in FIG. 2. The carrier 46 also supports a propelling cam 73 whose function is analogous to that of the cam 72.

The operation of a testing device which embodies the structure of FIG. 5 differentiates from the operation of the device 4 in that the circuit including the coil 124 and core 125 will cause the ejecting device to become operative when the distance between the follower 44 and the core 125 increases above a predetermined value whereas the circuit of FIG. 4 produces a signal when the distance between the leg 18 of a spring 16 and the core 25 decreases below a predetermined value.

Common to the embodiments of FIGS. 1, 2, 4 and FIG. 5 is the feature that the distance between the core 25 or 125 and the detector 14 or 43 must increase beyond a selected value if the ejecting device is to be set in operation.

The circuit which includes the coil 124 and core 125 must be assembled with a view to account for the fact that an ejecting signal must be produced in response to excessive movement of the follower 44 away from the core 125. In other words, the inductance of the coil 124 is influenced to a greater extent when the respective detector 43 tests a satisfactory cigarette and is influenced less when the detector 43 meets a defective cigarette. Therefore, this modified circuit includes known means which insure that the ejecting device does not respond to the generation but rather to the absence of signals. The tank circuit of the testing device shown in FIG. 5 may be adjusted in such a way that it is balanced during the intervals between consecutive testing operations and during testing of a defective article but is unbalanced during testing of a satisfactory article. Alternatively, the tank circuit may be balanced only during testing of a satisfactory article.

The oscillator circuit which includes the coil 24 or 124 is adjustable in such a way that it responds to an extremely small difference in density of a satisfactory and a defective filler. As stated before, this circuit can cause the device 5 or 35 to eject an article in response to the generation or in response to the absence of a signal. It is clear that the signal lamp 61 can be made to light up on testing of a satisfactory article or to light up when the displacement of a detector 14 or 43 in response to the bias of the associated spring 16 is excessive.

A very important advantage of the unit 20 is that it provides a purely electrical connection between the testing device and the ejecting device 5 or 35. Thus, this connection need not include links, gears or other mechanical motion transmitting or actuating parts which are subjected to extensive wear and whose inertia prevents them from operating at a very high speed. Also, this electrical connection can include a very efficient and highly reliable signal storing unit which, and as mentioned above, may be of the type disclosed for example in the copending application Ser. No. 431,355 of Esenwein owned by the same assignee.

The detectors 14 and 43 may be modified in a number of ways without departing from the spirit of my invention. For example, each detector may resemble a plate, a tube or a sphere. However, pin-shaped detectors or detectors having pin-shaped filler-engaging portions were found to be particularly effective, particularly when the diameter of the pin-shaped portion is somewhat smaller than the diameter of the filler. In its simplest form, the testing device may comprise a single detector 14 or 43 which is then movable only toward and away from the path defined by the conveyor means 2, 3 but need not rotate.

Also, the coil 24 or 124 need not be immediately adjacent to the testing station P, especially if the testing device comprises a plurality of detectors. For example, the coil 24 shown in FIG. 2 could be mounted in a zone adjacent to the left-hand side of the rotor 11 (diametrically opposite the station P) if the testing device 4 is provided with means for temporarily retaining the detectors 14 in such radial positions which correspond to maximum penetration into a tested filler. The detectors would then influence the inductance of the coil 24 while assuming positions corresponding to the position of the left-hand detector 14 shown in FIG. 2. Once moved past the coil, the detectors would be released so as to be ready for testing of the next-following cigarettes. However, the arrangement which is shown in FIG. 2 (i.e., wherein the coil 24 is immediately adjacent to the testing station P) has been found to be very satisfactory because the inductance of this coil changes simultaneously with each testing operation so that the completion of a density test upon a defective filler TF immediately results in the generation of a corresponding signal. The aforementioned modified apparatus wherein the coil 24 is distant from the station P would have to be provided with additional component parts in order to hold the detectors 14 in their radially outermost positions while the detectors advance from the station P toward and past the remote coil. Even minimal displacements of detectors during such travel from the station P to the coil could affect the accuracy of the respective test.

While it is conceivable to have the ejecting device 5 or 35 mounted directly at the testing station P, the arrangement shown in FIG. 1 is normally preferred because the conveyor means 2, 3 can be operated at a higher speed and because the station P is less crowded. As mentioned hereinabove, the delay unit of the actuating device 62 can cause identical delays in the transmission of signals to the ejecting device 5 or 35 if the conveyor means 2, 3 is invariably operated at the same speed. For example, the delay unit is then set to activate the device 5 or 35 exactly one second subsequent to detection of a defective article provided, of course, that it takes exactly one second for an article to move from the testing station P to the ejecting station A.

The core 25 or 125 may be omitted because each leg 18 or each detector 14 or 43 may be used as a movable core for the coil 24 or 124.

The adjusting means including the parts 26, 27, 31, 32, 33 of FIG. 2 or the carrier 46 of FIG. 5 enables the personnel in charge to convert the apparatus for testing of different types of rod-shaped articles as well as to change the sensitivity of the oscillator circuit during treatment of the same type of articles. The articulate connection 27 of FIG. 2 enables the operator to adjust the position of the coil 24 in an arcuate rather than in a straight path. This is advantageous because a detector 14 which moves radially outwardly in response to the bias of its displacing spring 16 also travels in an arcuate path (the flange 22 constitutes a fulcrum for the lower portions of the springs 16). In other words, the connection 27 enables the operator to adjust the position of the coil 24 along an arcuate path which is substantially an extension of the arcuate path in which a detector 14 travels under the bias of the spring 16 while located at the testing station P. Best results are obtained if the coil is adjusted by shifting the carrier 31 with reference to the support 33 and by simultaneously changing the angular position of the arm 26 about the connection 27.

The rotor 11 and the cover 13 form a protective housing around the printed part of the oscillator circuit 10. This printed part is provided on the insulating support 33, and the latter also carries the coil 24.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for testing the integrity of fillers in cigarettes and similar deformable rod-shaped articles, comprising conveyor means operative to advance the articles seriatim past a testing station; and testing means provided at said station for subjecting one end of a filler at said station to a density test, said testing means including a testing position comprising detector means movable toward the ends of fillers at said station and a second portion movable in response to movement of said testing portion, displacing means for biasing said detector means into the respective fillers whereby, in yielding to such bias, a defective filler permits excessive displacement of the detector means, and an oscillator circuit including an induction coil positioned to have its inductance changed in direct response to displacement of the second portion of said detector means so that such changes in inductance reflect the condition of the tested filler.

2. An apparatus as set forth in claim 1, further comprising ejecting means provided at an ejecting station adjacent to the path of articles and located past said testing station for ejecting articles with defective fillers in response to such changes in inductance of said coil which are caused by excessive displacement of the second portion of said detector means.

3. An apparatus as set forth in claim 2, further comprising delay means operatively connected between said oscillator circuit and said ejecting means for actuating said ejecting means with a delay required to advance a defective filler from said testing station to said ejecting station.

4. An apparatus as set forth in claim 2, wherein said ejecting means comprises a source of compressed gas, a nozzle connected with said source and having an orifice for discharging blasts of compressed gas against the articles on said conveyor means, and a normally closed solenoid valve for regulating the admission of compressed gas from said source to said orifice, said valve being opened in response to such changes in inductance of said coil which are caused by excessive displacement of the second portion of said detector means.

5. An apparatus as set forth in claim 1, wherein the testing portion of said detector means comprises at least one testing pin.

6. An apparatus as set forth in claim 1, wherein said testing means further comprises a rotor and the testing portion of said detector means comprises a plurality of annularly arranged testing pins mounted on said rotor and rotatable therewith in synchronism with the operation of said conveyor means so that said testing pins are moved seriatim into engagement with the ends of consecutive fillers.

7. An apparatus as set forth in claim 1, further comprising adjusting means for regulating the position of said coil with reference to the path of articles on said conveyor means.

8. An apparatus as set forth in claim 7, wherein said adjusting means comprises a support, a carrier connected with said coil and movable with reference to said support, and fastener means adjustably securing said carrier to said support.

9. An apparatus for testing the integrity of fillers in cigarettes and similar deformable rod-shaped articles, comprising conveyor means operative to advance the articles seriatim past a testing station; and testing means provided at said station for subjecting one end of a filler at said station to a density test, said testing means comprising detector means movable toward the ends of fillers at said station, displacing means for biasing said detector means into the respective fillers whereby, in yielding to such bias, a defective filler permits excessive displacement of the detector means, said displacing means comprising a U-shaped leaf spring having a first leg connected to said detector means and a second leg, and an oscillator circuit including an induction coil positioned adjacent to the second leg of said leaf spring to have its inductance changed by said second leg in direct response to displacement of said detector means so that such changes in inductance reflect the condition of the tested filler.

10. An apparatus as set forth in claim 9, wherein said second leg is arranged to move toward said coil in response to movement of said detector means away from the coil.

11. An apparatus for testing the integrity of fillers in cigarettes and similar deformable rod-shaped articles, comprising conveyor means operative to advance the articles seriatim past a testing station; and testing means provided at said station for subjecting one end of a filler at said station to a density test, said testing means comprising detector means including a testing pin movable toward the ends of fillers at said station and an extension, displacing means for biasing said pin into the respective fillers whereby, in yielding to such bias, a defective filler permits excessive displacement of said detector means, and an oscillator circuit including an induction coil positioned adjacent to said extension to have its inductance changed in direct response to displacement of said detector means so that such changes in inductance reflect the condition of the tested filler, said extension moving away from said coil when the testing pin penetrates into the end of a defective filler.

12. An apparatus for testing the integrity of fillers in cigarettes and similar deformable rod-shaped articles, comprising conveyor means operative to advance the articles seriatim past a testing station; and testing means provided at said station for subjecting one end of a filler at said station to a density test, said testing means comprising detector means movable toward the ends of fillers at said station, displacing means for biasing said detector means into the respective fillers whereby, in yielding to such bias, a defective filler permits excessive displacement of the detector means, an insulator, and an oscillator circuit including an induction coil positioned to have its inductance changed in direct response to displacement of said detector means so that such changes in inductance reflect the condition of the tested filler, a portion of said oscillator circuit being printed onto said insulator.

13. An apparatus as set forth in claim 12, wherein said coil is supported by said insulator.

14. An apparatus for testing the integrity of fillers in cigarettes, cigars, filter rods and similar deformable rod-shaped articles, comprising conveyor means operative to continuously advance the articles sideways and seriatim past a testing station; and testing means provided at said station for subjecting one end of a filler at said station to a density test, said testing means comprising a rotor adjacent to one side of the path of articles on said conveyor means, a plurality of detectors mounted on said rotor and each having a testing portion movable radially outwardly toward the ends of fillers at said station and a second portion movable in response to movement of the testing portion, said rotor being arranged to rotate in synchronism with the operation of said conveyor means so as to place the testing portions of its detectors seriatim into registry with consecutive fillers, displacing means mounted on said rotor for biasing the testing portions of said detectors into the respective fillers whereby, in yielding to such bias, a defective filler permits excessive displacement of the respective second portion, and an oscillator circuit including an induction coil positioned to have its inductance changed in direct response to displacement of the second portion of that detector whose testing portion registers with a filler so that such changes in inductance reflect the condition of the tested filler.

15. An apparatus as set forth in claim 14, wherein said conveyor means comprises equidistant holders for the articles and further comprising backup means for holding the articles against axial movement during engagement of their fillers with the testing portions of said detectors.

16. An apparatus as set forth in claim 14, wherein said testing means further comprises propelling means for effecting sudden movement of the testing portions of consecutive detectors against the ends of aligned fillers at said testing station.

17. An apparatus as set forth in claim 16, wherein said propelling means comprises a fixed cam and followers provided on said detectors and arranged to track said cam ahead of said testing station to thereby move the testing portions of respective detectors against the bias of said displacing means so that the displacing means stores energy which is suddenly released on disengagement of a follower from said cam.

References Cited
UNITED STATES PATENTS

| | | | |
|---|---|---|---|
| 2,296,719 | 9/1942 | Looney | 209—88 X |
| 3,064,809 | 11/1962 | Anthony | 209—88 |
| 3,073,034 | 1/1963 | Antoszewski | 209—88 |
| 3,168,196 | 2/1965 | Harder | 209—90 |
| 3,237,764 | 3/1966 | Kochalski | 73—81 X |
| 3,273,710 | 9/1966 | Early | 209—88 |

M. HENSON WOOD, JR., *Primary Examiner.*

R. A. SCHACHER, *Assistant Examiner.*